United States Patent [19]

Hinojos

[11] 4,437,697

[45] Mar. 20, 1984

[54] RETRACTABLE AUTOMOBILE SIDEGUARD

[76] Inventor: Paul R. Hinojos, 1302 W. Amelia, Phoenix, Ariz. 85009

[21] Appl. No.: 409,656

[22] Filed: Aug. 19, 1982

[51] Int. Cl.³ .............................................. B60R 19/00
[52] U.S. Cl. .................................. 293/118; 293/128; 280/770
[58] Field of Search ..................... 293/128, 119, 9, 10, 293/118; 280/770

[56] References Cited

U.S. PATENT DOCUMENTS

| | | | |
|---|---|---|---|
| 3,718,357 | 2/1973 | Hertzell | 293/128 |
| 4,025,098 | 5/1977 | Powaska | 293/128 |
| 4,217,715 | 8/1980 | Bryan | 293/128 |
| 4,221,410 | 9/1980 | Dawson | 293/128 |
| 4,221,412 | 9/1980 | Miller | 293/118 |
| 4,234,222 | 11/1980 | Bays | 293/119 |

Primary Examiner—Robert R. Song
Attorney, Agent, or Firm—Cahill, Sutton & Thomas

[57] ABSTRACT

A retractable automobile sideguard device includes first and second telescoping assemblies which are extendable from first and second tubular housings attached to the bottom of an automobile. Each telescoping assembly includes a first member which, when fully extended from the tubular housing, pivots and is locked into an upright position and a second member which, when fully extended from the first member, pivots to a horizontal position and engages a like member from the other telescoping mechanism, thereby forming a side rail that prevents damage to the finish of door panels and side panels of the automobile due to careless opening of doors of other cars that are too closely parked to the protected automobile.

12 Claims, 12 Drawing Figures

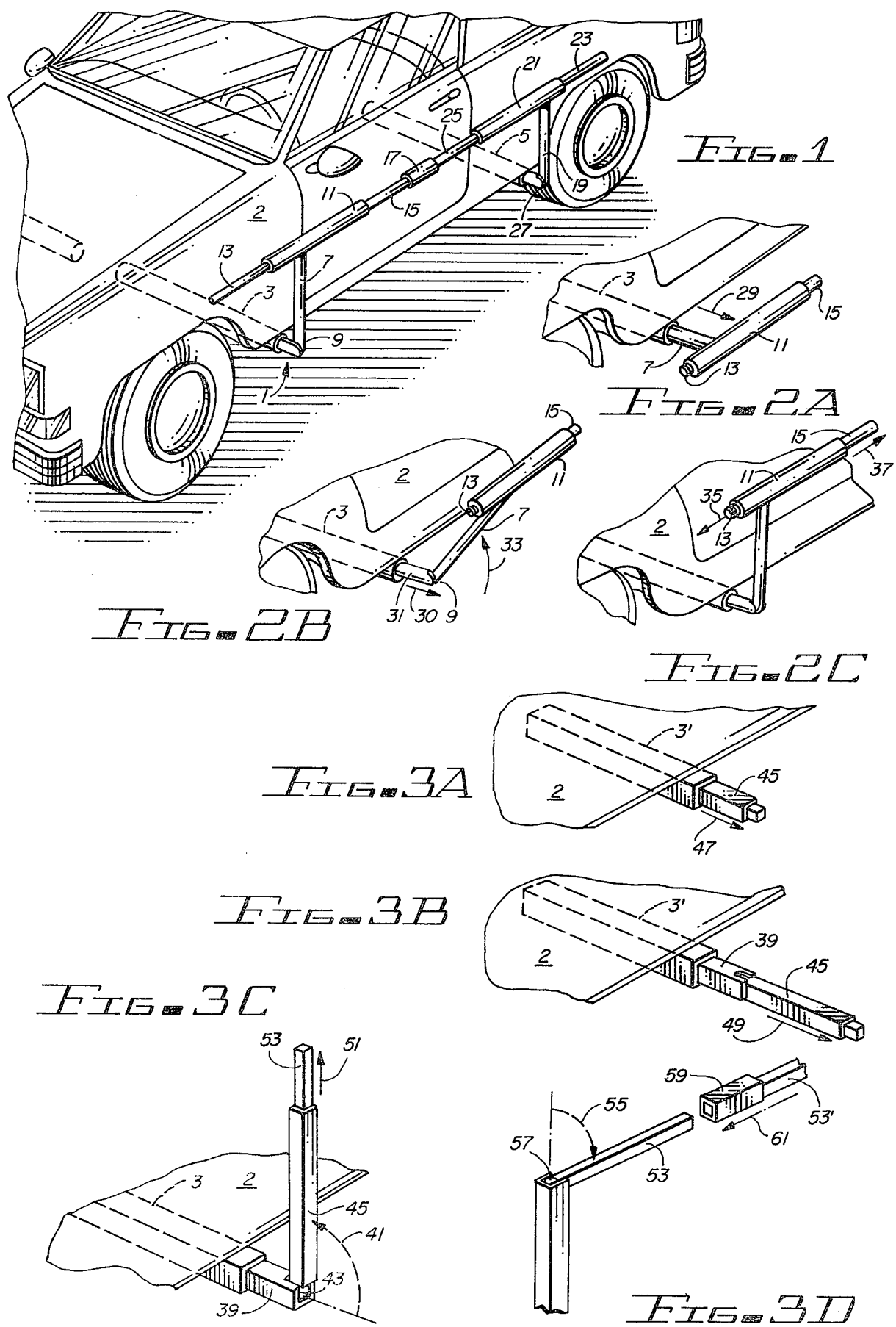

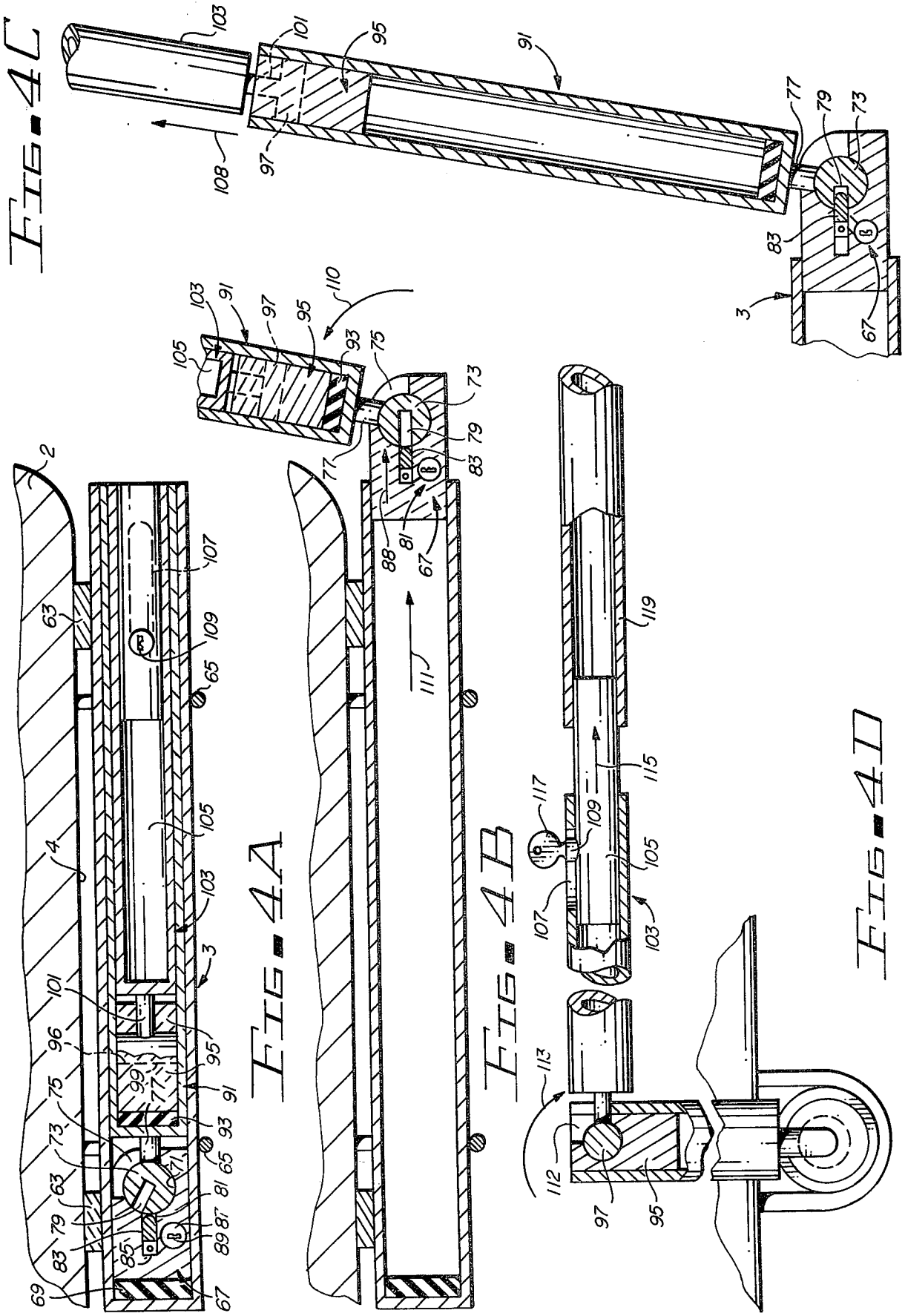

RETRACTABLE AUTOMOBILE SIDEGUARD

BACKGROUND OF THE INVENTION

The invention relates to apparatus for protecting the door panels and side panels of an automobile to prevent them from being nicked when persons carelessly park other cars beside the subject automobile and carelessly open their doors so that the edges thereof would strike the side of the protected car if it were not for the protective apparatus.

New car manufacturers and/or automobile dealers frequently attach protective side molding along the side and door panels of automobiles in order to protect the paint thereon from nicks which are usually caused when adjacent parked cars open their doors so widely that the edges of the opened doors contact and gouge the paint of the adjacent parked automobile, sometimes also causing dents in the metal of the contacted side or door panel. The side molding strips, which commonly are formed of rubber-like or plastic material, are fairly attractive and do indeed offer a significant degree of protection to the side panels and door panels of the automobile on which they are installed. However, such side molding strips normally are quite narrow, and do not extend more than approximately one-half inch outward from the surface of the side panel or door panel. Consequently, doors of adjacent parked cars frequently nevertheless damage the finish and paint of many automobiles with such side molding strips attached. This, of course, can be very upsetting to owners of expensive sport cars, luxury automobiles and the like who take great pride in the appearance of their expensive cars.

In order to overcome the shortcomings of such side molding strips, numerous retractable sideguard strips and members have been proposed to engage opening doors of adjacent parked automobiles and prevent the edges of such doors from damaging the paint on the side panels and door panels of the automobile on which such devices are installed. The state of the art for such devices is believed to be accurately shown in U.S. Pat. Nos. 3,704,037; 3,718,357; 3,738,695; 4,217,715; 4,221,410; 4,221,412; 4,234,222; and 4,294,478. Some of the retractable side bumper devices disclosed in the above references, for example, the ones disclosed in U.S. Pat. Nos. 3,718,357, 4,221,412 and 4,234,222, are unduly complex and expensive. Other devices, such as those in U.S. Pat. Nos. 3,704,037 and 3,738,695 are inconvenient to utilize and store when they are not being utilized. Other devices, such as the one shown in U.S. Pat. No. 4,221,410 are of inherently weak construction and furthermore are aesthetically quite unpleasing in appearance when they are in their retracted configuration.

Accordingly, it is an object of the invention to provide an improved retractable sideguard for automobiles which is not aesthetically unpleasing when in its retracted configuration.

It is another object of the invention to provide a retractable sideguard for automobile door panels and side panels which is of sufficiently rugged construction to be able to effectively prevent damage to the protected door and/or side panels when a heavy door of an adjacent parked car is swung into the side of the first parked car.

It is another object of the invention to provide a retractable sideguard device for an automobile which is not aesthetically unpleasing in appearance when in a retracted configuration, and which also functions effectively as an anti-theft device when in its extended configuration.

SUMMARY OF THE INVENTION

Briefly described, and in accordance with one embodiment thereof, the invention provides a retractable guard mechanism for protecting side panels and/or door panels of an automobile in which the sideguard mechanism is installed, the entire sideguard mechanism including first and second telescoping mechanisms that are completely retractable into first and second tubular housings attached to the bottom of the automobile and disposed perpendicularly to the plane of the side door of the automobile. The first telescoping mechanism includes a first tubular member that can be fully extended from the first tubular housing and pivoted into an upright position and locked into the upright position. A first piston-like pivot block is slidably disposed in the first tubular housing and includes a pivot bearing element to which one end of the first tubular member is attached. A locking device is disposed in the first pivot block for engaging the first pivot bearing element to prevent rotation thereof to achieve locking of the first tubular member in the upright position. In one described embodiment of the invention, the upper end of the first tubular member has a cross member attached thereto which functions as a guard rail. In another described embodiment of the invention, a second tubular member is telescopically disposed within the first tubular member, wherein the second tubular member is retracted from the first tubular member and pivoted to a horizontal position. In this embodiment of the invention, a second piston-like pivot block is slidably disposed in the first tubular member, and includes a second rotatable bearing element that is attached to one end of the second tubular member. The other end of the second tubular member engages the free end of a like second tubular member of the second telescoping mechanism which has been extended in a similar manner from the second tubular housing. In one described embodiment of the invention, a locking element is disposed in the means for engaging the free end of the second tubular element of the first telescoping mechanism with the free end of the second tubular element of the second telescoping mechanism, so that the fully extended assembly functions as an anti-theft device by preventing the door of the vehicle being opened.

BRIEF DESCRIPTION OF THE DRAWINGS

FIG. 1 is a partial perspective view of one embodiment of the invention.

FIGS. 2A–2C are partial perspective diagrams illustrating extending of the protective sideguard device of FIG. 1 from its retracted position to its fully extended position.

FIGS. 3A–3D are partial perspective drawings that illustrate extension of a second embodiment of the invention from its fully retracted to its fully extended configuration.

FIGS. 4A–4D are section views of an embodiment of the invention similar to that of FIGS. 3A–3D and disclose the details of the pivot mechanisms and locking mechanisms associated with the embodiments of the invention shown in FIGS. 1 and 3A–3D.

DESCRIPTION OF THE INVENTION

Referring to the drawings, particularly FIG. 1, sideguard mechanism 1, which is installed on automobile 2, includes two tubular housing elements 3 and 5 that are attached to the bottom of automobile 2. The sideguard mechanism 1 is shown in its fully extended configuration, wherein a first telescoping mechanism has been extended from tubular housing 3 and a second telescoping mechanism has been extended from tubular housing 5. The first telescoping mechanism includes an upright member 7 which is connected by means of a pivot mechanism 9 to a piston-like pivot block (subsequently described) that slidably moves within tubular housing 3. A horizontal T-bar 11 is rigidly attached to the outer end of tubular member 7. Two telescoping rods 13 and 15 are extended from the opposed ends of T-bar 11, as shown.

Similarly, a tubular member 19 is pivotally connected by means of a pivot mechanism to a slidable piston-like pivot block in tubular housing 5. A horizontal T-bar 21 is connected to the free end of tubular member 19 and includes telescoping rods 23 and 25 which have been extended out of the opposed ends of T-bar 21. The free ends of telescoping rods 15 and 25 each extend into an elongated sleeve 17 so that extended rod 13, T-bar 11, extended rod 15, elongated sleeve 17, extended rod 25, T-bar 21, and extended rod 23 cooperate to form a single rigid rod extending horizontally along the side of automobile 2 at least three to five inches from the side thereof. The construction of the above mentioned pivot blocks, tubular members, T-bars, and telescoping rods is sufficiently durable that the sideguard mechanism 1 will easily absorb the energy from a heavy door of an adjacently parked luxury automobile or truck when the door thereof is being carelessly, rapidly opened up without regard for the presence of automobile 2.

The manner of extending sideguard mechanism 1 is now described with reference to FIGS. 2A–2C. In FIG. 2A, it can be seen that tubular member 7 is being drawn out of tubular housing 3 from its retracted position in the direction indicated by arrow 29. At this point, rods 13 and 15 are in their retracted positions.

As shown in FIG. 2B, after tubular member 7 has been completely extended, a pivot block 31 partially extends out of tubular housing 3 in the direction indicated by arrow 30. Tubular member 7 is then pivoted upward toward the illustrated upright position, as indicated by arrow 33. As subsequently explained, when tubular member 7 reaches its desired upright orientation, a locking mechanism contained in pivot bearing assembly 9 locks tubular member 7 into its final upright position, which is shown in FIG. 2C. At this point, telescoping rods 13 and 15 are extended in the directions indicated by arrows 35 and 37, respectively. The portion of the sideguard mechanism 1 contained in tubular housing 5 is extended in a manner entirely similar to that just described, and the free ends of telescoping rods 15 and 25 then are extended into elongated tubular coupling member 17 to provide the desired rigid coupling between rods 15 and 25. Retracting of the sideguard mechanism is performed by performing the above steps in reverse order.

In an alternate embodiment of the invention, instead of using rigid T-bars 11 and 21 attached to the free ends of members 7 and 19, as shown in FIG. 1, additional telescoping members that recede into tubular members 7 and 19 can be utilized. One such telescoping assembly is shown in FIGS. 3A–3D, wherein reference numeral 3' designates a tubular housing attached to the bottom of automobile 2. First tubular member 45 in FIG. 3A corresponds to tubular member 7 in FIG. 1, and is withdrawn from tubular housing 3' in the direction indicated by arrow 47. Once tubular member 45 has been extended as far as it will go, a portion of pivot block 39 then extends outward from tubular housing 3' as far as it will go, in the direction indicated by arrow 49. Then, as shown in FIG. 3C, tubular member 45 pivots to its upright position in the direction indicated by arrow 41, and the above mentioned locking mechanism associated with pivot bearing 43 (not shown in FIG. 3) is engaged, locking tubular member 45 into the upright position. Then, a rod 53, which is telescopically disposed in tubular member 45, is withdrawn therefrom in the direction indicated by arrow 51. A second piston-like pivot block (not shown) includes a second pivot bearing mechanism 57, as shown in FIG. 3D. Rod 53 is pivoted to a horizontal configuration, as indicated by arrow 55. The other portion of the sideguard assembly similarly extends from a tubular housing such as 5, and would have a rod such as 53' (FIG. 3D) extending toward member 61. A sleeve 59, similar in function to sleeve 17 in FIG. 1, would then be positioned to engage the free ends of both members 53 and 53', thereby providing a rigid coupling. The member 53, sleeve 59, and member 53' then form a rigid side rail that protects the side and door panels of automobile 2 from the above-mentioned damage due to carelessness by adjacent parked cars when their owners carelessly swing the doors of their cars wide open without regard to damage they may do to adjacent parked cars.

Referring now to FIGS. 4A–4C, FIG. 4A shows a section view of a modified version of the embodiment of the invention shown in FIGS. 3A–3D. Reference numeral 3 designates a tubular housing analogous to tubular housings 3 shown in FIGS. 1 and 2A–2C and 3' shown in FIGS. 3A–3D. Reference numbers 63 illustrate blocks or pads, which can be somewhat resilient, disposed between the outer surface of tubular housing 3 and the bottom of the body or suitable frame members of automobile 2. Reference numeral 65 represents two U-bolts which can be used to tightly draw housing 3 against the bottom surfaces of pads or blocks 63.

Tubular housing 3 has a smooth inner surface. In FIG. 4A, which shows one entire telescoping assembly retracted into tubular housing 3, a slidable piston-like pivot block 67 is disposed in the deepest portion of housing 3. A rubber cushion 69 is disposed between the left end plate of tubular housing 3 and the left end of slidable pivot block 67 to absorb any shock as the assembly is retracted. At the right end of pivot block 67, a cylindrical bearing element 73 is rotatably disposed in a cylindrical hole 71. A rod 77 is rigidly attached to the cylindrical wall of bearing element 73 and extends through a slot 75 in pivot 67. The other end of rod 77 is attached to the bottom plate of a telescoping member 91. Telescoping member 91 can be withdrawn toward the right out of stationary tubular housing 3. When this happens, pivot block 67 also moves to the right, as subsequently explained with reference to FIG. 4B. Inside tubular member 91, there is disposed a second shock-absorbing rubber cushion 93, against which a second pivot block 95 rests when a second tubular member 103 is fully retracted into tubular member 91.

A second cylindrical bearing element 97 is disposed in a cylindrical hole 96 in pivot block 95. Note that cylindrical bearing element 97 is vertical in FIG. 4A, wherein it is horizontal in FIGS. 4B-4D, as subsequently described. A rod 101 rigidly engages the surface of cylindrical bearing element 97 and extends through a slot 112 (FIG. 4D) to rigidly engage the bottom of tubular member 105. Disposed within the interior of tubular member 103 is a rod 105, which performs the function of rod 53 in FIGS. 3C and 3D. A slot 107 (FIGS. 4A and 4D) is disposed in the surface of tubular telescoping element 103 through which a peg 109 extends. Peg 109 functions both as a handle by means of which the user can conveniently extend rod 105 and also contains a locking mechanism which locks rod 105 into its outwardly extended configuration.

Referring now to FIG. 4B, arrow 111 shows the direction in which tubular member 91 and pivot block 67 are slid to extend the telescoping assembly from tubular housing 3. A limiting flange or ridge (not shown) is provided on the outer end of tubular housing 3 to limit the outward extent to which pivot block 67 can be slid. Alternatively, one or more spring loaded balls and corresponding detents can be provided so that pivot block 67 automatically locks into a predetermined position at the outer end of tubular housing 3. The details of such mechanism can be readily implemented by those skilled in the art, and therefore are not shown in detail in the drawings.

As shown in FIG. 4B, once pivot block 67 as been moved to the right to its limiting position, tubular member 91 is pivoted upright in the direction indicated by arrow 110. At this point, it should be noted that cylindrical element 73 includes a plunger receiving hole 79 therein. When tubular member 91 is in its desired upright position, plunger receiving hole 79 is aligned with a plunger 83 of a locking mechanism 81. When locking mechanism 81 is actuated, plunger 83 moves in the direction indicated by arrow 88. The mechanism illustrated in FIGS. 4A, 4B and 4C simply schematically illustrates a locking device with a tumbler and a keyhole by means of which plunger 83 can be actuated to move it into plunger receiving hole 79 to thereby lock the arm 91 in its upright configuration or withdraw plunger 83 from hole 79 to unlock the device by means of a key.

Referring now to FIG. 4C, the next step in extending the telescoping assembly from housing 103 includes pulling tubular shaft 103 out of tubular member 91 in the direction indicated by arrow 108. This causes piston-like pivot block 95 to also move in the direction of arrow 108 until it reaches the limiting position shown in FIGS. 4C and 4D. Referring now to FIG. 4D, tubular member 103 is then pivoted to a horizontal position, laterally to the side of automobile 2, as indicated by arrow 113. Then, the user grasps peg 109 through slot 107 and moves rod 105 to the right, as indicated by arrow 115, so that the extreme right end of rod 105 moves into a receiving open end of a tubular member 119 which has been retracted from a similar telescoping assembly from another tubular housing, such as tubular housing 5 of FIG. 1, mounted on the same automobile. Peg 109 can include a locking mechanism that engages the outer wall of tubular member 103 to prevent rod 105 from being retracted. Reference numeral 117 schematically designates a key that can be utilized to engage this locking assembly.

The device described herein can be composed of sufficiently durable metal tubes, rods, and bearing elements to provide the needed strength and durability at a low cost. The fact that the device in its retracted configuration is relatively unnoticeable, is easily extendable and retractable, and is sufficiently durable to prevent adjacent swinging car doors from damaging the side panels and/or door panels of automobile 2 makes it a highly desirable accessory for expensive automobiles.

While the invention has been described with reference to several particular embodiments thereof, those skilled in the art will be able to make various modifications to the disclosed embodiments of the invention without departing from the true spirit and scope thereof. It is intended that the invention include all equivalents of the disclosed embodiment of the invention which perform essentially the same function to achieve substantially the same result in substantially the same way.

I claim:

1. A retractable side guard assembly for use on an automobile to protect door panels or the like, said assembly comprising in combination:
   a. a first assembly including a first tubular housing for rigid attachment to the bottom of a first automobile approximately perpendicularly to the plane of a side of said first automobile, said first tubular housing having an open outer end;
   b. a first arm telescopically disposed in said first tubular housing, said first arm having a first and a second end;
   c. first pivot means movably disposed in said first tubular housing for pivotally connecting said first end of said first arm to said first tubular housing and permitting said first arm to be extended out of said open outer end of said first tubular housing and then pivoted upward to an upright position;
   d. first locking means for rigidly locking said first arm into said upright position relative to said first tubular housing; and
   e. a second arm having a first end connected to said second end of said first arm for extending laterally along the side of said first automobile when said first arm is in said upright position.

2. The retractable side guard assembly of claim 1 wherein said first pivot means includes:
   first piston means slidably disposed in said first tubular housing for constraining movement of said first piston means in said first tubular housing to allow extending and retracting of said first arm; and
   first pivot bearing means rotatably disposed in said first piston means for pivotally connecting said first end of said first arm to said first piston means.

3. The retractable side guard assembly of claim 2 wherein said first arm is tubular, and wherein said second arm is telescopically disposed in said first arm, the second end of said first arm being open to allow said second arm to be extended from and retracted into said first arm.

4. The retractable side guard assembly of claim 3 further including second pivot means movably disposed in said second arm for pivotally connecting said first end of said second arm to said first arm and permitting said second arm to be extended out of the open second end of said first arm when said first arm is in its upright position and then pivoted downward to an approximately horizontal position lateral to the side of said first automobile.

5. The retractable side guard assembly of claim 4 wherein said second pivot means includes:
   second piston means slidably disposed in said first arm for constraining movement of said second piston means in said first arm to allow extending and retracting of said second arm; and second pivot bearing means rotatably disposed in said second piston means for pivotally connecting said first end of said second arm to said second piston means.

6. The retractable side guard assembly of claim 5 wherein said first pivot bearing means includes a first cylindrical bearing element that rotates about an approximately horizontal axis as said first arm is pivoted to said upright position.

7. The retractable side guard assembly of claim 6 wherein said second pivot bearing means includes a second cylindrical bearing element having an axis that is approximately vertical when both said first arm and said second arm are retracted into said first tubular housing, said axis of said second cylindrical element moving to an approximately horizontal position as said first arm is pivoted upward to said upright position, said second cylindrical bearing element rotating about its horizontal axis as said second arm pivots downward to its horizontal, lateral position.

8. The retractable side guard assembly of claim 7 further including a second assembly similar to said first assembly, a second tubular assembly of said second assembly being constructed for rigid attachment to the bottom of said first automobile in spaced approximately parallel relationship to said first tubular housing.

9. The retractable side guard assembly of claim 8 wherein said second assembly includes a first arm telescopically disposed in said second tubular housing and a second arm telescopically disposed in that first arm, and means for rigidly connecting the second end of the second arm of said first assembly to a second end of the second arm of said first assembly when all of said arms are fully extended in order to form a rigid guard rail disposed laterally along the side of said first automobile.

10. The retractable side guard assembly of claim 9 wherein a portion of said first piston means extends beyond the second end of said first tubular housing and another portion of said first piston means remains in said first tubular housing when said first arm of said first assembly is fully extended from said first tubular housing.

11. The retractable side guard assembly of claim 10 wherein said second arm of said second assembly and said second arm of said first assembly are tubular and said rigid coupling means includes a rod telescopically disposed in said second arm of said first assembly and extendable into the second arm of said second assembly.

12. The retractable side guard assembly of claim 11 further including means for locking said rod into its extended position into said second arm of said second assembly wherein said retractable side guard assembly also serves as an anti-theft device.

* * * * *